United States Patent [19]

Naves et al.

[11] 4,119,043
[45] Oct. 10, 1978

[54] RAILWAY CAR COUNTERBALANCED TILTING DECK

[75] Inventors: David G. Naves, Calumet City, Ill.; Herman A. Aquino, Hobart; Mitchell L. Morgan, Highland, both of Ind.

[73] Assignee: Pullman Incorporated, Chicago, Ill.

[21] Appl. No.: 775,824

[22] Filed: Mar. 9, 1977

[51] Int. Cl.² .................. B60P 3/08; B61D 3/04; B61D 3/16; F16F 1/06

[52] U.S. Cl. .................. 105/368 R; 105/370; 211/13; 267/72; 292/213; 292/219; 296/1 A

[58] Field of Search .................. 105/368 R, 370; 296/1 A; 211/13; 267/72; 292/219

[56] References Cited

U.S. PATENT DOCUMENTS

| | | | |
|---|---|---|---|
| 2,385,115 | 9/1945 | Stuart | 296/1 A |
| 2,461,927 | 2/1949 | Schaldach et al. | 296/1 A |
| 2,647,010 | 7/1953 | Huebshman | 105/368 R X |
| 2,758,552 | 8/1956 | Browne | 105/368 R |
| 2,959,262 | 11/1960 | Parker et al. | 105/368 R X |
| 3,003,435 | 10/1961 | Chapman | 105/368 R |
| 3,113,800 | 10/1963 | Troy | 105/368 R X |
| 3,180,285 | 4/1965 | Gutridge | 105/368 R |
| 3,424,489 | 1/1969 | Hoy | 105/368 R X |
| 3,449,010 | 6/1969 | Hoy | 105/368 R X |
| 3,690,717 | 9/1972 | Taylor | 105/368 R X |
| 3,913,496 | 10/1975 | Lohr | 296/1 A X |
| 3,927,621 | 12/1975 | Skeltis et al. | 105/368 R |

Primary Examiner—Albert J. Makay
Assistant Examiner—Howard Beltran
Attorney, Agent, or Firm—Thomas G. Anderson

[57] ABSTRACT

A railway car for transporting vehicles comprises a floor having a plurality of vertically spaced decks, one of said decks comprising a hinged deck section which may be raised above the floor of the car for facilitating loading. A counterbalancing mechanism is connected to the car structure and to the hinged deck and a locking device is provided for securing the hinged deck in both lowered or raised positions.

9 Claims, 5 Drawing Figures

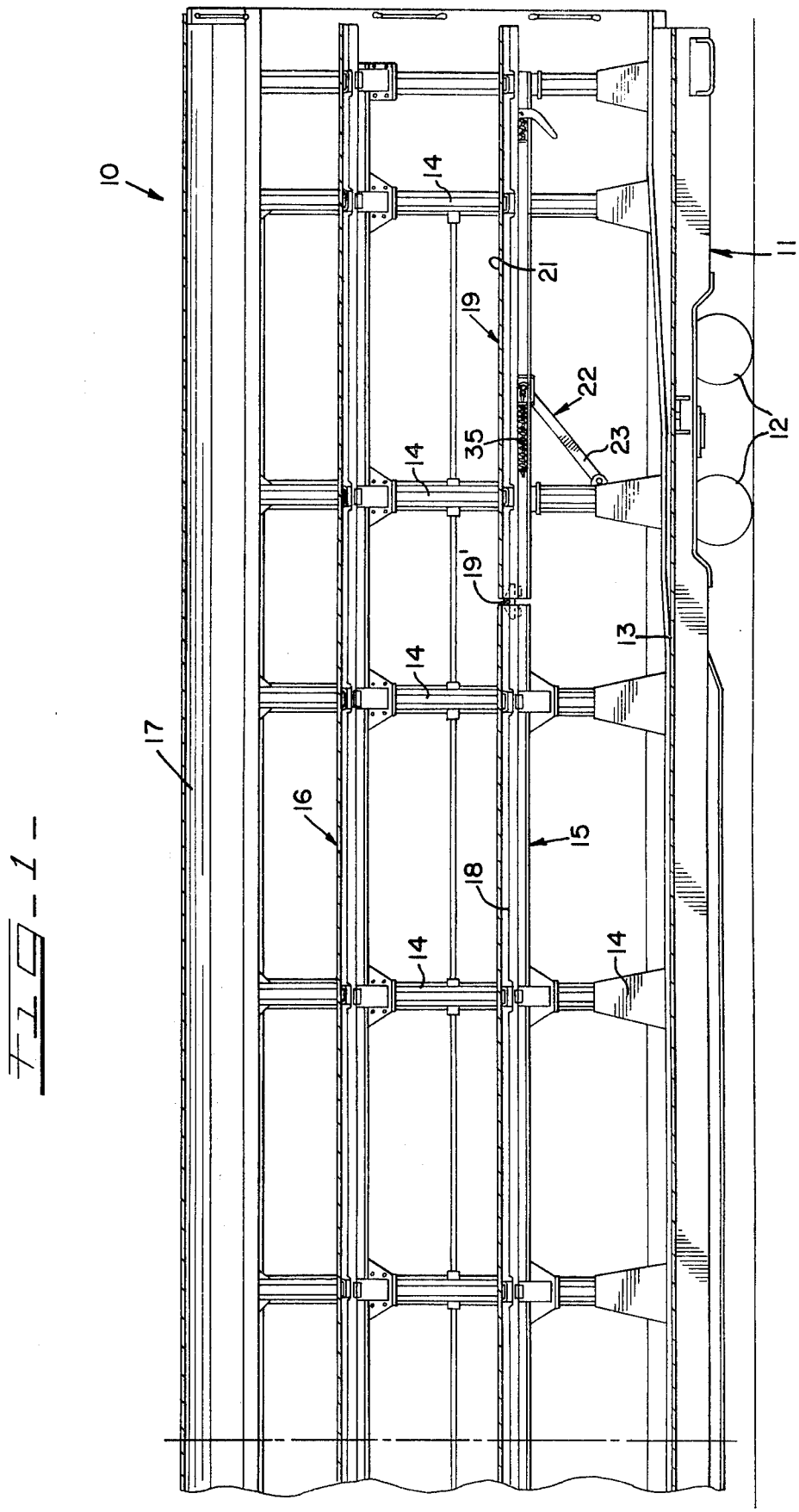

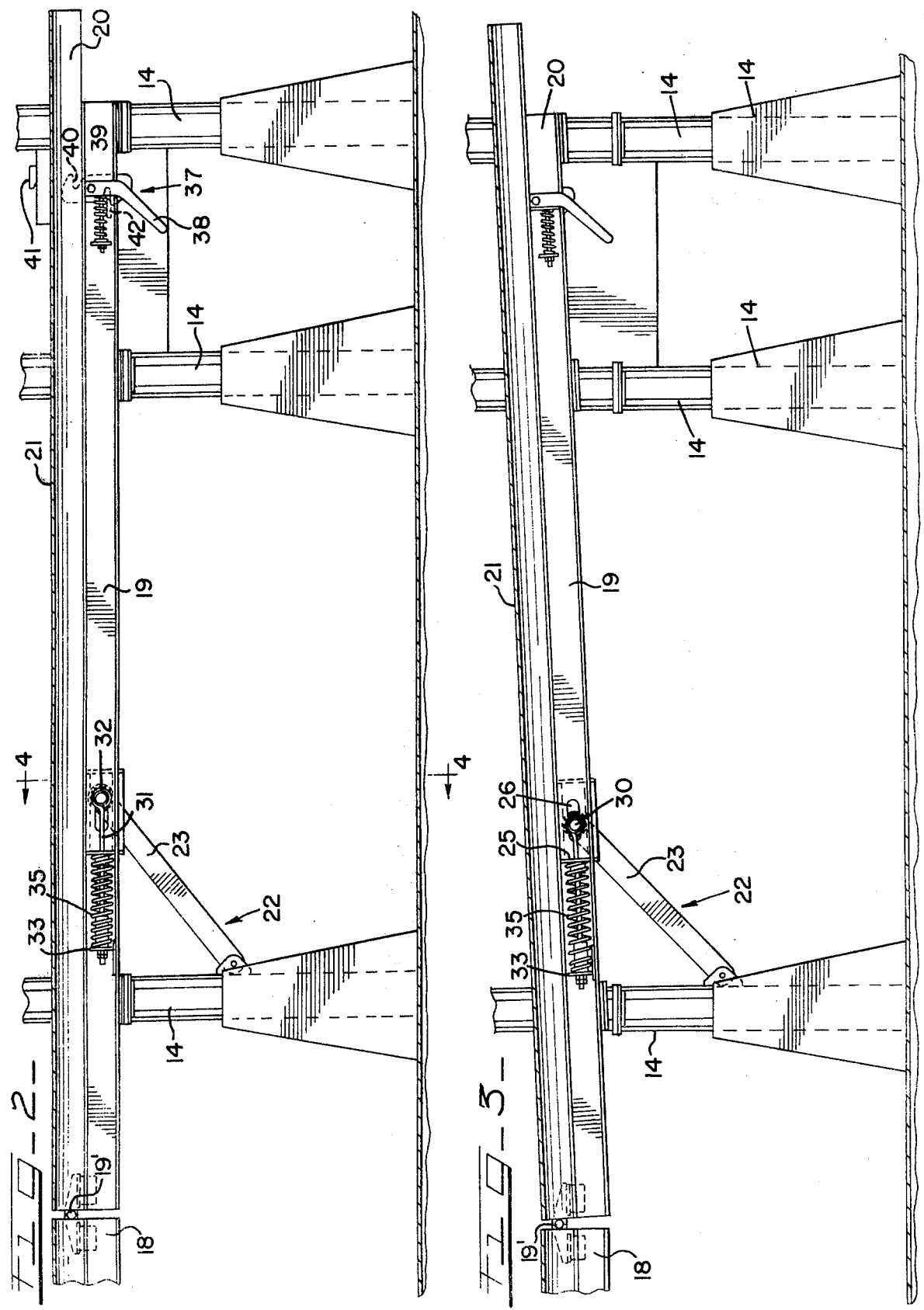

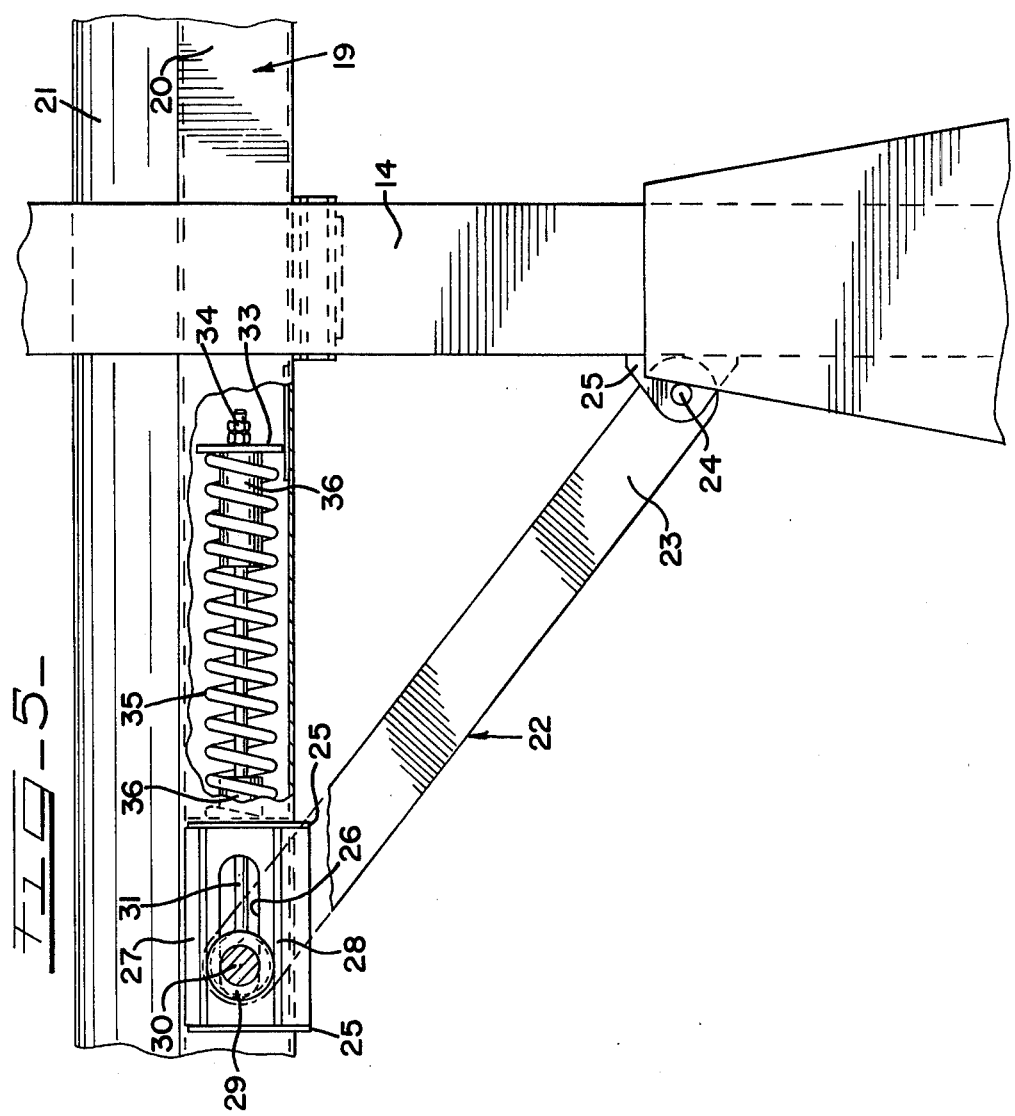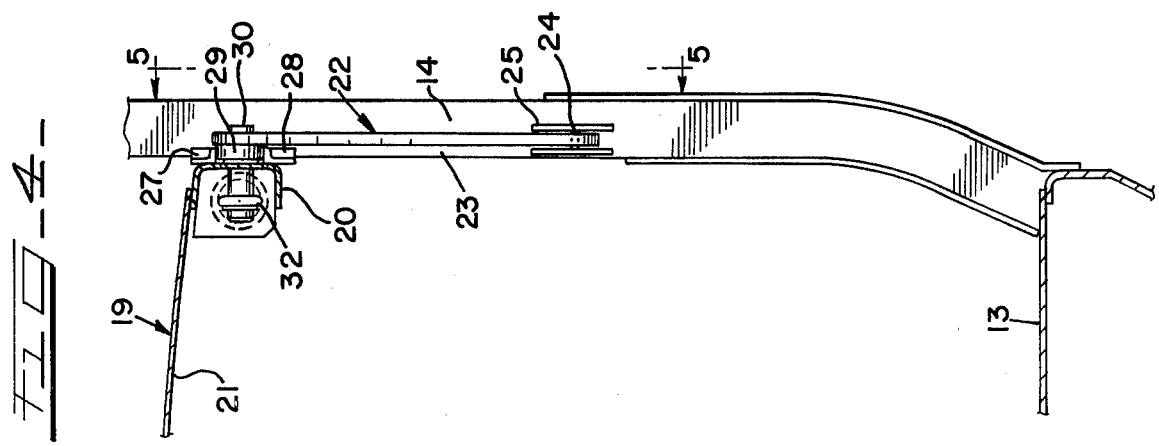

RAILWAY CAR COUNTERBALANCED TILTING DECK

BACKGROUND OF THE INVENTION

1. Field of the Invention

The invention relates to railway cars and particularly to a car having a plurality of decks for transporting motor vehicles thereon.

2. Description of the Prior Art

The prior art includes U.S. Pat. Nos. 2,385,115 Sept. 18, 1945, 2,758,552 Aug. 14, 1956, 2,959,262 Nov. 8, 1960, 3,003,435 Oct. 10, 1961, 3,180,285 Apr. 27, 1965, 3,424,489 Jan. 28, 1969 and, 3,449,010 June 10, 1969.

The present invention is an improvement over the prior art. Related patent applications are Ser. No. 772,199 filed Feb. 25, 1977 and Ser. No. 772,200 filed Feb. 25, 1977.

SUMMARY OF THE INVENTION

A railway car for transporting motor vehicles includes a floor and at least one upper deck having a rigid section and a hinged deck section which may be raised and lowered for accommodating loading of the vehicles on the floor of the car. The hinged deck includes a locking device so that it may be secured in a lower or vehicle-carrying position and said locking device also locking the deck in a raised position as desired. In order to facilitate the raising and lowering of the hinged deck section a counterbalancing mechanism is provided which includes an arm pivotally connected to the post structure of the car the said arm also being pivotally connected to the hinged deck by means of a bracketing arrangement which includes an elongated slot within which the pivot is longitudinally movable during raising and lowering of the deck. The bracketing arrangement also supports a tension rod and spring structure which normally provides a spring biasing action to assist in raising the deck to its raised position.

BRIEF DESCRIPTION OF THE DRAWINGS

FIG. 1 is a cross-sectional view through one end of a railway car for transporting vehicles;

FIG. 2 is an enlarged cross-sectional view of a hinged deck and counterbalancing mechanism;

FIG. 3 is a view similar to FIG. 2 showing a hinged deck in a raised position;

FIG. 4 is a cross-sectional view taken substantially along the line 4—4 of FIG. 2;

FIG. 5 is a side-elevational view partially in section taken along the line 5—5 of FIG. 4.

DESCRIPTION OF THE PREFERRED EMBODIMENT

FIG. 1 discloses a railway car 10 having a conventional underframe 11 supported on wheel trucks 12. One end of the car is disclosed and includes a floor or bottom deck 13 comprising upright post structure 14 supported on the car on opposite sides of the bottom deck 13. The upright post structure 14 also supports first and second decks 15 and 16, respectively. A suitable roof structure 17 is provided on the railway car 10. The deck 15 includes a first deck section 18 which is rigidly supported on the side post structure 14. A second hinged deck section 19 is pivotally connected to the first deck section 18 by means of hinged brackets 19' as best shown in FIGS. 2 and 3. Each of the decks includes longitudinally and transversely spaced channels 20 on which floor sheets 21 are supported. A counterbalance arrangement 22 is provided for counterbalancing the hinging movement of the second deck section 19. The arrangement 22 comprises a lever arm or brace 23 pivotally connected as indicated at 24 to a pair of vertical plates 25 provided on one of the post structures 14. A slot 26 is provided in one of the channels 20 and has supported thereon the outer side thereof an upper track 27 and a lower track 28. The roller 29 is rotatable on a shaft or pivot means 30 to which a tension rod 31 is connected. The tension rod 31 includes an eye 32 which is secured about the shaft 30. The tension rod has secured thereto at one end thereof a spring retainer 33 by means of nuts 34. A coil spring 35 is held captive between the spring retainer 33 and against one of the vertical plates 25. The tension rod projects through the latter plate 25 and spring guides 36 suitably guide the biasing action of the spring 35 on the tension rod.

The hinged deck 19 also is provided with a suitable lock structure 37 which includes a handle 38 adapted to pivotally move a lock arm 39 more specifically described in one of the aforementioned patent applications. The lock arm 39 includes upper and lower keeper engaging hook portions 40 which are adapted to alternately engage keeper members 41 and 42 supported on suitable brackets carried by the post structure 14.

THE OPERATION

Loading of the floor and upper decks with motorized vehicles is accomplished in conventional manner wherein the vehicles are driven onto the floors and deck sections as desired. During the loading of the lower floor it is desirable to move the hinged deck section to a raised position so as to expedite the loading operation. This is achieved by disengaging the locking mechanism 37 from the lower keeper 42 which then permits the operator to raise the deck.

The counterbalancing arrangement is such that the spring continually urges the roller and shaft respectively, 29 and 30, from the position shown in FIG. 2 to the position shown in FIG. 3, this biasing action permitting the operator to readily raise the end of the deck to the position shown in FIG. 3 wherein the upper hook engaging portion 40 of the lock mechanism is adapted to engage the keeper 41 in a locking position so that the deck is out of the way and loading is facilitated. The spring 35 held captive between one of the plates 25 and the spring urges the lever arm 23 and shaft 30 to which it is connected in a counterclockwise direction thereby urging the hinge deck section 19 to be moved to its raised position as shown in FIG. 3.

What is claimed is:

1. For a railway car for transporting vehicles including a car body having a floor, a plurality of longitudinally spaced upright side posts connected to said body an opposite sides of the floor, a deck supported on said side posts in vertical spaced relation above said floor, said deck including a vehicle carrying first deck section rigidly connected to said side posts, a second vehicle carrying deck section, means hingedly supporting said second section with respect to said first section whereby one end of said second section may be pivotally moved between raised and lowered positions about an axis extending transversely of the car, locking means on said car and second deck section selectively releasably locking said second deck section in said positions, the improvement of a support and movement limiting arrangement for said second deck comprising:

an arm extending diagonally between the second section and an adjacent post, means pivotally supporting an end of said arm on the adjacent post to accommodate movement of said arm in a vertical plane extending longitudinally of the car, second means pivotally connecting the other end of said arm to said second deck section, said second pivotal means including guide means protectively carried within said second deck section and including stop means limiting longitudinal movement of said other end of said arm relative to said second deck in a direction substantially parallel to said second deck section for supportively limiting arcing movement thereof.

2. The invention in accordance with claim 1, including biasing means reactive with said other end of said arm carried with said second deck section and reactive therewith to urge said second deck into said raised position, and said arm being supportively operative to said second deck section in the lowered position thereof.

3. The invention in accordance with claim 2, said stop means including a bracket on said second deck having a slot, and said second pivoted means including a pivot pin connecting said other end of said arm to said biasing means;

said pivot pin being slideably supported in said slot.

4. The invention in accordance with claim 3, said slot being disposed in parallel relation to said second deck section.

5. The invention in accordance with claim 4, said biasing means including a tension rod connected to said second pivotal means, and spring means on said tension rod.

6. The invention in accordance with claim 5, said biasing means including a spring retainer on one end of said tension rod, said guide means including a second bracket supported on said second deck section, said second bracket having a spring abutment wall including an opening, said tension rod projecting slideably through said opening, and said spring being held captive between said abutment wall and said spring retainer.

7. The invention in accordance with claim 6, said guide means including upper and lower tracks adjacent said slot for guiding said pivot pin.

8. The invention accordance with claim 7, said pivot pin having a roller means journalled thereon, and said roller being supported on said upper and lower tracks.

9. In a railway car for transporting vehicles comprising a car body having a floor, a plurality of upright side posts connected to the body along opposite edges of said floor, a deck supported from said posts in vertically spaced relation to said floor, said deck including a deck section pivotally mounted along one edge for vertical swinging movement between said posts about a substantially horizontal axis, said deck section having a channel understructure, lift means for the deck section including a brace having one end pivotally connected to an adjacent post on an axis generally parallel to the pivotal axis of said deck section and having a slidable pivotal connection at its other end to said deck section understructure on an axis substantially parallel to the axis of pivot of said deck section, and biasing means disposed generally parallel to said deck section within said understructure and reactively mounted between said deck section and said slidable connection of said brace for biasing said deck section to swing upwardly, said slidable connection having means limiting arcuate pivotal movement of said deck section and said brace subtending the angle of intersection between said adjacent post and said deck section and providing a support for the latter.

* * * * *